United States Patent
Ramamonjison et al.

(10) Patent No.: US 12,437,516 B2
(45) Date of Patent: Oct. 7, 2025

(54) METHOD AND SYSTEM FOR ADAPTATION OF A TRAINED OBJECT DETECTION MODEL TO ACCOUNT FOR DOMAIN SHIFT

(71) Applicants: Rindranirina Ramamonjison, Burnaby (CA); Amin Banitalebi Dehkordi, Vancouver (CA); Xinyu Kang, Vancouver (CA); Yong Zhang, Vancouver (CA)

(72) Inventors: Rindranirina Ramamonjison, Burnaby (CA); Amin Banitalebi Dehkordi, Vancouver (CA); Xinyu Kang, Vancouver (CA); Yong Zhang, Vancouver (CA)

(73) Assignee: HUAWEI CLOUD COMPUTING TECHNOLOGIES CO., LTD., Guiyang (CN)

( * ) Notice: Subject to any disclaimer, the term of this patent is extended or adjusted under 35 U.S.C. 154(b) by 330 days.

(21) Appl. No.: 18/317,889

(22) Filed: May 15, 2023

(65) Prior Publication Data
US 2023/0281974 A1    Sep. 7, 2023

Related U.S. Application Data

(63) Continuation of application No. PCT/CA2021/051625, filed on Nov. 16, 2021.
(Continued)

(51) Int. Cl.
*G06V 10/774* (2022.01)
*G06V 10/764* (2022.01)
*G06V 10/82* (2022.01)

(52) U.S. Cl.
CPC .......... *G06V 10/774* (2022.01); *G06V 10/764* (2022.01); *G06V 10/82* (2022.01)

(58) Field of Classification Search
CPC .... G06V 10/774; G06V 10/764; G06V 10/82; G06V 20/52; G06N 3/045; G06N 3/08
See application file for complete search history.

(56) References Cited

U.S. PATENT DOCUMENTS 10,719,301 B1    7/2020    Dasgupta et al.
2020/0242771 A1    7/2020    Park et al.
(Continued)

FOREIGN PATENT DOCUMENTS

EP    3731144 A1    10/2020

OTHER PUBLICATIONS

Sankaranarayanan, Swami et al. "Generate to adapt: Aligning domains using generative adversarial networks", Proceedings of the IEEE Conference on Computer Vision and Pattern Recognition, pp. 8503-8512 2018.
(Continued)

*Primary Examiner* — Mekonen T Bekele

(57) ABSTRACT

The present disclosure provides a method and system for adapting a machine learning model, such as an object detection model, to account for domain shift. The method includes receiving a labeled data elements and target image samples and performing a plurality of model adaptation epochs. Each adaptation epoch includes: predicting for each of the target image samples, using the machine learning model configured by a current set of configuration parameters, a corresponding target class label for the respective target data object included in the target image sample; generating a plurality of labeled mixed data elements that each include: (i) a mixed image sample including a source data object from one of the source image samples and a target data object from one of the target image samples, and (ii) the corresponding source class label for the source data object and the corresponding target class label for the target data object. The method also includes adjusting the current
(Continued)

set of configuration parameters to minimize a loss function for the machine learning model for the plurality of mixed data elements. The method results in adapted machine learning model that accounts for domain shift and that has improved performance at inference on new target image samples.

20 Claims, 13 Drawing Sheets

Related U.S. Application Data

(60) Provisional application No. 63/114,367, filed on Nov. 16, 2020.

(56) References Cited

U.S. PATENT DOCUMENTS

| | | | |
|---|---|---|---|
| 2020/0249674 A1 | 8/2020 | Dally et al. | |
| 2020/0327029 A1 | 10/2020 | Prakash et al. | |
| 2020/0334520 A1* | 10/2020 | Chen | G06F 40/20 |

OTHER PUBLICATIONS

Sun, Baochen and Saenko, Kate, "Deep coral: Correlation alignment for deep domain adaptation", European conference on computer vision, pp. 443-450 2016.
Tzeng, Eric et al. "Deep domain confusion: Maximizing for domain invariance", arXiv preprint arXiv:1412.3474 2014.
Long, Mingsheng et al. "Learning transferable features with deep adaptation networks", International conference on machine learning, pp. 97-105 2015.
Gretton, Arthur et al. "A kernel two-sample test", The Journal of Machine Learning Research, vol. 13, No. 1, pp. 723-773 2012.
Russo, Paolo et al. "From source to target and back: symmetric bi-directional adaptive gan", Proceedings of the IEEE Conference on Computer Vision and Pattern Recognition, pp. 8099-8108 2018.
Bousmalis, Konstantinos et al. "Unsupervised pixel-level domain adaptation with generative adversarial networks", Proceedings of the IEEE conference on computer vision and pattern recognition, pp. 3722-3731 2017.
Hendrycks, Dan and Dietterich, Thomas, "Benchmarking neural network robustness to common corruptions and perturbations", arXiv preprint arXiv:1903.12261 2019.
Michaelis, Claudio et al. "Benchmarking robustness in object detection: Autonomous driving when winter is coming", arXiv preprint arXiv:1907.07484 2019.
Kamann, Christoph and Rother, Carsten, "Benchmarking the Robustness of Semantic Segmentation Models with Respect to Common Corruptions", International Journal of Computer Vision, pp. 1-22 2020.
Kamann, Christoph and Rother, Carsten, "Benchmarking the Robustness of Semantic Segmentation Models", Proceedings of the IEEE/CVF Conference on Computer Vision and Pattern Recognition, pp. 8828-8838 2020.
Hendrycks, Dan et al. "The many faces of robustness: A critical analysis of out-of-distribution generalization", arXiv preprint arXiv:2006.16241 2020.
Hendrycks, Dan et al. "Augmix: A simple data processing method to improve robustness and uncertainty", arXiv preprint arXiv:1912.02781 2019.
Cygert, Sebastian and Czyewski, Andrzej, "Toward Robust Pedestrian Detection With Data Augmentation", vol. 8, pp. 136674-136683 2020.
Rusak, Evgenia et al. "A simple way to make neural networks robust against diverse image corruptions", European Conference on Computer Vision, ECCV 2020.
Schneider, Steffen et al. "Improving robustness against common corruptions by covariate shift adaptation", arXiv preprint arXiv:2006.16971 2020.
Benz, Philipp et al. "Revisiting Batch Normalization for Improving Corruption Robustness", arXiv preprint arXiv:2010.03630 2020.
French, Geoffrey et al. "Self-ensembling for visual domain adaptation", ICLR 2018.
Sohn, Kihyuk et al. "A Simple Semi-Supervised Learning Framework for Object Detection", arXiv preprint arXiv:2005.04757 2020.
Zhang, Hongyi et al. "mixup: Beyond empirical risk minimization", arXiv preprint arXiv:1710.09412 2017.
Ramamonjison R, et al. SimROD: A Simple Adaptation Method for Robust Object Detection .arXiv preprint arXiv:2107.13389, Jul. 28, 2021 total 25 pages.

* cited by examiner

Generate Mixed Samples 204

Inputs: A batch $\mathcal{B}$ of $B$ images, labels $\{y_i\}$ from source data $\mathcal{D}$, unlabeled target data $\overline{\mathcal{D}}$, pseudo-labels $\{\overline{y}_j\}$

Output: A batch of domain-mixed samples $\widehat{\mathcal{B}}$

1: procedure DOMAINMIX($\mathcal{B}, \overline{\mathcal{D}}, \{\overline{y}_j\}$)
2:     $\widehat{\mathcal{B}} \leftarrow \emptyset$
3:     for $i \leftarrow 1, B$ do
4:       $\mathcal{S} \leftarrow \{(x_i, y_i)\}$
5:       for $j \leftarrow$ sample($\mathcal{D} \cup \overline{\mathcal{D}}, 3$) do
6:         if $j \in \overline{\mathcal{D}}$ then
7:           $\mathcal{S} \leftarrow \mathcal{S} \cup \{(\overline{x}_j, \overline{y}_j)\}$
8:         else
9:           $\mathcal{S} \leftarrow \mathcal{S} \cup \{(x_j, y_j)\}$
10:       Collate crops from 4 images in $\mathcal{S}$ into $\widehat{x}_i$
11:       Recompute all box coordinates in $\mathcal{S}$ into $\widehat{y}_i$
12:       $\widehat{\mathcal{B}} \leftarrow \widehat{\mathcal{B}} \cup \{(\widehat{x}_i, \widehat{y}_i)\}$

FIG. 4

Method 200

Inputs: Source model $\theta_M^s$, labeled source data $\overline{\mathcal{D}}$, unlabeled target data $\mathcal{D}$, warmup epochs $w$, total epochs $T$, steps per epoch $N$, and batch size $B$
Output: Adapted model $\theta_M^a$ 1: procedure ADAPT($\theta_M^s, \mathcal{D}, \overline{\mathcal{D}}$)
2:     for $\overline{x}_j \leftarrow \overline{\mathcal{D}}$ do $\overline{y}_j \leftarrow$ GenPseudo($\overline{x}_j, \theta_M^s$)
3:     Initialize $\theta \leftarrow \theta_M^s$
4:     for $layer \leftarrow \theta$.layers do
5:         if layer is not BatchNorm then Freeze layer
6:     for $epoch \leftarrow 1, \ldots, T$ do
7:         if $epoch == w$ then   ▷ switch to Phase 2
8:             for $\overline{x} \leftarrow \overline{\mathcal{D}} \cup \mathcal{D}$ do $\overline{y}_j \leftarrow$ GenPseudo($\overline{x}_j, \theta$)
9:             Unfreeze all layers
10:        for $step \leftarrow 1, \ldots, N$ do
11:            Sample a batch $\beta = \{(x_i, y_i)\}_{i=1}^B$ from $\mathcal{D}$
12:            $\hat{\beta} \leftarrow$ DomainMix($\beta, \overline{\mathcal{D}}, \{\overline{y}_j\}$) as in FIG. 4
13:            Update $\theta$ to minimize the loss with $\hat{\beta}$
14:     $\theta_M^a \leftarrow \theta$

```
┌─────────────────────────────────────────────────────────────────────┐
│   Receive a plurality of labeled data elements that each include    │
│                                                                     │
│  (i) a source sample including a respective source data object, and │
│  (ii) a corresponding source class label for the respective source  │
│                            data object                              │
│                                                                     │
│                                 602                                 │
└─────────────────────────────────────────────────────────────────────┘
                                  ↓
┌─────────────────────────────────────────────────────────────────────┐
│ Receive a plurality of target samples each including a respective   │
│                        target data object                           │
│                                                                     │
│                                 604                                 │
└─────────────────────────────────────────────────────────────────────┘
                                  ↓
┌─────────────────────────────────────────────────────────────────────┐
│ Predict for each of the plurality of targets samples, using the     │
│ machine learning model configured by the current set of             │
│ configuration parameters, a corresponding target class label for    │
│ the respective target data object included in the targets sample    │
│                                                                     │
│                                 606                                 │
└─────────────────────────────────────────────────────────────────────┘
                                  ↓
┌─────────────────────────────────────────────────────────────────────┐
│     Generate a plurality of labeled mixed data elements that each   │
│                                include                              │
│                                                                     │
│  (i) a mixed sample including a source data object from one of the  │
│ source samples and a target data object from one of the target      │
│ samples, and (ii) the corresponding source class label for the      │
│ source data object and the corresponding target class label for the │
│                          target data object                         │
│                                                                     │
│                                 608                                 │
└─────────────────────────────────────────────────────────────────────┘
                                  ↓
┌─────────────────────────────────────────────────────────────────────┐
│ Adjust the current set of configuration parameters to minimize a    │
│ loss function for the machine learning model for the plurality of   │
│ labeled mixed data elements                                         │
│ (In some examples, for an initial set of model adaptation epochs,   │
│ only BatchNorm model layer parameters are adjusted, after which     │
│ configuration parameters for all model layers are adjusted)         │
│                                                                     │
│                                 610                                 │
└─────────────────────────────────────────────────────────────────────┘
                                  ↓
┌─────────────────────────────────────────────────────────────────────┐
│ Repeat 608 to 614 for a plurality of model adaptation epochs and    │
│ then output the current set of configuration parameters for the     │
│ machine learning model.                                             │
│                                                                     │
│                                 612                                 │
└─────────────────────────────────────────────────────────────────────┘
```

FIG. 6

Algorithm 2 DomainMix augmentation

Inputs: A batch $\mathcal{B}$ of $B$ images and ground-truth labels from source data $\mathcal{D}$
Inputs: Unlabeled target data $\overline{\mathcal{D}}$ and pseudo-labels $\{\overline{z}_j\}$
Output: A batch of domain-mixed samples $\hat{\mathcal{B}}$ 1: procedure DOMAINMIX($\mathcal{B}, \overline{\mathcal{D}}, \{\overline{z}_j\}$)
2:     $\hat{\mathcal{B}} \leftarrow \emptyset$
3:     for $i \leftarrow 1, B$ do
4:       $\mathcal{S} \leftarrow \{(x_i, y_i)\}$
5:       for $j \leftarrow \text{sample}(\mathcal{D} \cup \overline{\mathcal{D}}, 3)$ do
6:         if $k \in \overline{\mathcal{D}}$ then
7:           $\mathcal{S} \leftarrow \mathcal{S} \cup \{(\overline{x}_k, \overline{z}_k)\}$
8:         else
9:           $\mathcal{S} \leftarrow \mathcal{S} \cup \{(x_k, y_k)\}$
10:       Collate crops from 4 images in $\mathcal{S}$ into $\hat{x}_i$
11:       Transform all box labels in $\mathcal{S}$ into $\hat{z}_i$
12:     $\hat{\mathcal{B}} \leftarrow \hat{\mathcal{B}} \cup \{(\hat{x}_i, \hat{z}_i)\}$

FIG. 10

Algorithm 1 Self-labeling adaptation framework

Inputs: Source model $\theta^s$, labeled source data $\mathcal{D}$ and unlabeled target data $\widetilde{\mathcal{D}}$
Inputs: Number of warmup epochs $w$ and total epochs $T$
Inputs: Number of steps per epoch $N$ and batch size $B$
Output: Adapted model $\theta^a$ 1: procedure ADAPT($\theta^s$, $\mathcal{D}$, $\widetilde{\mathcal{D}}$)
2:      for $\widetilde{x}_j \leftarrow \widetilde{\mathcal{D}}$ do $z_{i,j} \leftarrow$ GenPseudo($\widetilde{x}_j, \theta^s$)
3:      Initialize $\theta \leftarrow \theta^s$
4:      for *layer* $\leftarrow \theta$.layers do
5:         if layer is not BatchNorm then Freeze layer
6:      for *epoch* $\leftarrow 1, T$ do
7:         if epoch == $w$ then
8:            for $\widetilde{x} \leftarrow \widetilde{\mathcal{D}}$ do $z_{i,j} \leftarrow$ GenPseudo($\widetilde{x}_j, \theta$)
9:            Unfreeze all layers
10:        for *step* $\leftarrow 1, N$ do
11:            Sample a batch $\beta = \{(x_i, y_i)\}_{i=1}^{B}$ from $\mathcal{D}$
12:            $\hat{\beta} \leftarrow$ DomainMix($\beta, \widetilde{\mathcal{D}}, \{\widetilde{z}_j\}$)) as in Algo 2.
13:            Update $\theta$ to minimize the loss with $\hat{\beta}$

FIG. 11

METHOD AND SYSTEM FOR ADAPTATION OF A TRAINED OBJECT DETECTION MODEL TO ACCOUNT FOR DOMAIN SHIFT

CROSS-REFERENCE TO RELATED APPLICATIONS

The present application is a continuation of International Patent Application No. PCT/CA2021/051625, filed Nov. 16, 2021, the contents of which are incorporated herein by reference, and which claims the benefit of and priority to U.S. Provisional Patent Application No. 63/114,367, filed Nov. 16, 2020, "METHOD AND SYSTEM FOR DOMAIN ADAPTATION OF A TRAINED MACHINE LEARNING MODELS FOR DOMAIN SHIFT", the contents of which are incorporated herein by reference.

FIELD

The present disclosure relates to domain adaptation in machine learning, and in particular to a method and system for adaptation of a trained object detection model to account for domain shift.

BACKGROUND

Domain shift is a phenomenon that degrades the performance a trained machine learning model ("trained model). A trained model for a particular task (e.g. a model that is trained to perform a particular task using a training dataset comprising labeled training data and a machine learning algorithm) often underperforms when it is deployed to a computing system operating in a real-environment because the distribution of a set of new data used at inference by the trained model for the particular task can shift away from the distribution of the set of training data used to train the model. Domain shift is often more severe when the same trained model for a particular task is deployed to several different computing systems at various different locations and the new data is different than the training data due to changes in operating environment or distortions in the new data.

An important form of domain shift is low-level image corruptions. When a trained model is a trained object detection model and corrupted digital images are input to the trained object detection model, the trained object detection model may not be able to detect any objects at all in the corrupted digital images, the trained object detection model may detect an object in the corrupted digital images but it may classify the object detected in the corrupted digital images with an incorrect object category label, or the trained object detection model may classify an object detected in the corrupted with a correct object category label but not generate an accurate bounding box for the detected object. If the distribution of a set of test images used for testing the performance of the trained object detection model drifts significantly from distribution of the set of labeled training images used to train the object detection model, the performance of trained object detention model when deployed for inference using a set of new images will degrade and the object detection model may completely fail at detecting objects in the set of new images.

Domain shift can be more severe when the same trained object detection model is deployed in many locations with varying environmental conditions. For example, in an outdoor surveillance camera system, different cameras can capture a scene in varying amounts of light, shade, rain, fog, wind, snow, sunlight, etc., or can be geometrically positioned at different angles, heights, and orientations. In addition, visual characteristics and texture of a scene will also look different when captured by different cameras of the outdoor surveillance camera system. The accuracy of a trained object detection model decreases when the trained object detection model receives a set of new images of a scene which have different visual characteristics and texture than the training images used to train the object detection model.

One solution that has been proposed to address the domain shift problem for a trained object detection model involves further training a trained object detection model with a set of new images that are from the target domain. The target domain is the population of set of new images that have the same distribution as a set of test images on which the object detection is tested in the target environment. This solution involves collecting as many labeled images as possible, from all variations, and re-training a trained object detection model with the additional labeled images covering different target domains. Although the approach of re-training the object detection model with the sets of images from new target domains can improve the performance of the trained object detection model during inference on the new images from these new target domains, this approach is impractical because the approach is very laborious and expensive due to requirement to annotate new images with labels to form new labeled images from new target domains for all possible target domains.

Another solution proposed to address the domain shift problem for a trained object detection model involves domain adaption. Domain adaptation involves changing the learned parameters of an object detection model that was initially trained on a source training dataset to adapt to the new target domain. Recent methods for domain adaptation of trained object detection model can include domain-alignment methods, and domain-mapping methods. Domain-alignment methods_force a trained object detection model to learn features that are invariant to the target domain. Domain-alignment methods co-train two identical object detection models: the first model receives images from source domain training dataset and the second model receives its images from a target domain training dataset. A domain classifier takes the feature outputs of these two models to discriminate whether the image comes from a source domain training dataset or target domain training dataset. They use complicated training loss function during training to enforce that the two co-trained models learn features that are invariant to the source and target domains (e.g. minimizes the distance metrics between co-variance matrices of the intermediate layers' features). Domain-alignment methods requires changes to the object detection model because the object detection model must be trained together with a domain classifier.

Domain-mapping methods for a trained object detection model to learn the style of the images from a target domain (otherwise referred to as target domain images) using images from the source domain (otherwise referred to source domain images) and convert the source domain images into new synthetic images that resemble target domain images. This is often done using a conditional generative adversarial network (GAN) and other image-to-image translation networks were proposed to apply the style of target domain images to source domain images, thereby emulating the domain shift over labeled data (proposes to do this in a cycle-consistent manner, from source to target and vice versa.

For domain shift that is due to image corruption, methods have also been proposed to address this type of domain shift. These methods are categorized as augmentation-based methods, feature alignment based methods, semi or weakly supervised training methods. Alignment based methods improve robustness of object detection model by augmenting the clean images with diverse and random transformations or perturbations, with the hope that these augmentation-based methods generate some labeled training images that have perceptual similarity to the actual corruptions observed by the object detection model during inference). Feature alignment based (to align statistics of activations). Semi or weakly supervised training methods involve further training a trained object detection model using unlabeled training images.

Existing domain adaptation methods have attempted to improve the robustness of trained object detection models against image corruptions. However, there have shortcomings that limit their effectiveness to the domain shifts cause by image corruptions. The augmentation/adversarial based methods mostly rely on the clean labeled data and synthetic augmentations. Existing domain adaptation methods do not take full advantage of target domain data. Existing augmentation methods assume that they produce images that are diverse enough to be a close proxy to actual corrupted target domain images. Alignment-based methods require complicated changes the object detection model (e.g. the architecture of a neural network object detection model) since a domain classifier is needed to discriminate whether a training image is from the source domain or the target domain. Moreover, existing domain adaptation methods have not shown significant performance improvement on object detection task. On the other hand, methods that leverage unlabeled images from the target domain can adapt the trained object detection model to domain shift. However, the main challenge is how to acquire accurate pseudo-labels in the presence of domain shift. In fact, a naïve generator of pseudo labels from the object detection model that is trained with the source domain training dataset, leads to noisy labels and thereby a poor training due to the domain shift.

Accordingly, improved methods and systems for adapting trained models to account for domain shift are therefore desirable.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer implemented method for adapting a machine learning model that is configured by a learned set of configuration parameters. The method includes: receiving a plurality of labeled data elements that each include: (i) a source image sample including a respective source data object, and (ii) a corresponding source class label for the respective source data object; and receiving a plurality of target image samples each including a respective target data object. The method further includes performing a plurality of model adaptation epochs, where for an initial model adaptation epoch the learned set of configuration parameters is used as a current set of configuration parameters for the machine learning model. Each model adaptation epoch may include: predicting for each of the plurality of targets image samples, using the machine learning model configured by the current set of configuration parameters, a corresponding target class label for the respective target data object included in the target image sample; generating a plurality of labeled mixed data elements that each include: (i) a mixed image sample including a source data object from one of the source image samples and a target data object from one of the target image samples, and (ii) the corresponding source class label for the source data object and the corresponding target class label for the target data object; and adjusting the current set of configuration parameters to minimize a loss function for the machine learning model for the plurality of labeled mixed data elements. When performing the plurality of model adaptation epochs is completed, the current set of configuration parameters is output as a final set of adapted configuration parameters for the machine learning model. Other embodiments of this aspect include corresponding computer systems, apparatus, and computer programs recorded on one or more computer storage devices, each configured to perform the actions of the methods.

In one or more implementations of the general aspect, the trained machine learning model may include a plurality of first type layers performing a first type of computation and a plurality of second type layers performing a second type of computation, the first type layers being configured by a first group of the configuration parameters and the second type layers being configured by a second group of the configuration parameters, where for an initial set of the plurality of model adaptation epochs, adjusting the current set of configuration parameters may include adjusting the second group of the configuration parameters while maintaining constant values for the first group of the configuration parameters; and for a further set of the plurality of model adaptation epochs, adjusting the current set of configuration parameters may include adjusting the both first group of the configuration parameters and the second group of the configuration parameters.

In some implementations, the first type layers perform matrix multiplication computations, the first group of the configuration parameters including weights for the matrix multiplication computations; and the second type layers perform batch normalization computations, the second group of configuration parameters including batch normalization beta and gamma parameters.

In some implementations of one or more of the preceding aspects, the machine learning model is a deep learning neural network model may include multiple network computational blocks that each include one of the first type of layers and one of the second type of layers.

In some implementations of one or more of the preceding aspects, the data elements each include a source bounding box definition associated with each source class label to indicate a location of the respective source data object within the image sample. The mixed image samples are each composite image samples that include image portions from one of the source image samples and from one of the target image samples. For each model adaptation epoch, predicting for each of the plurality of target image samples also may include predicting a target bounding box definition associated with the corresponding target class label, the target bounding box indicating a location of the respective target data object within the target image sample. The plurality of labeled mixed data elements each include: (i) a corresponding source bounding box definition that indicates a location of the at least one source data object within the mixed image sample of the labeled mixed data element; (ii) a corresponding target bounding box definition that indicates a location of the at least one target data object within the mixed image sample of the labeled mixed data element.

In some implementations of one or more of the preceding aspects, at least some of the mixed image samples of the plurality of mixed data elements include a plurality of source data objects from one or more of the source image samples, and a plurality of target data objects from one or more of the target image samples, and the mixed data elements each include corresponding source class labels for each source data object included in the mixed image sample of the mixed data element and corresponding target class labels for each target data object included in the mixed image sample of the mixed data element.

In some implementations of one or more of the preceding aspects, adjusting the current set of configuration parameters to minimize a loss function for the machine learning model is performed over a set of iterations that are performed for a respective batch of the of labeled mixed data elements.

In some implementations of one or more of the preceding aspects, the method of may include adapting a second machine learning model that is configured by a learned set of second configuration parameters by: using the machine learning model with the final set of adapted configuration parameters to predict, for each of the plurality of targets image samples, a corresponding target class label for the respective target data object included in the target image sample; generating a further plurality of labeled mixed data elements that each include: (i) a mixed image sample including a source data object from one of the source image samples and a target data object from one of the target image samples, and (ii) the corresponding source class label for the source data object and the corresponding target class label for the target data object; and adjusting the set of second configuration parameters to minimize a loss function for the second machine learning model for the further plurality of labeled mixed data elements. In some implementations, the second machine learning model has a smaller neural network size than the machine learning model with the final set of adapted configuration parameters.

In some implementations of one or more of the preceding aspects, the method can include receiving a request through a network from computing device to adapt the machine learning model that is configured by a learned set of configuration parameters; and returning the final set of adapted configuration parameters for the machine learning model to the requesting computer device. Implementations of the described techniques may include hardware, a method or process, or computer software on a computer-accessible medium.

In a further example aspect, a processing system is disclosed that includes one or more processing circuits and one or more memories storing computer software instructions that when executed by the one or more processing circuits configure the processing system to perform one or more of the preceding methods.

BRIEF DESCRIPTION OF DRAWINGS

FIG. 4 is pseudocode representation of the operation for generating mixed image samples, according to example embodiments;
FIG. 5 is pseudocode representation of the gradual adaptation method of FIG. 2, according to example embodiments;
FIG. 6 is a flowchart representation of a gradual adaptation method, according to example embodiments;
FIG. 10 is pseudocode representation of an operation for generating mixed image samples in the method of FIG. 8, according to example embodiments;
FIG. 11 is pseudocode representation of the gradual adaptation method of FIG. 9, according to example embodiments.

The Figures are illustrative of example embodiments. Additional embodiments and configurations are possible.

DETAILED DESCRIPTION

In computer vision, a trained machine learning model may be used to perform object detection (e.g., object localization and classification). When a trained machine learning model is used to perform objection detection (referred to hereinafter as a trained object detection model) and the trained object detection model is deployed to a computing system to perform inference using a new set of images which are different than the set of labeled training images that was used to train the object detection model, domain shift can occur. Domain shift occurs due to changes in the operating environments (e.g. weather) where the digital images are captured or due to distortions in the digital images (e.g. blurring). The labeled training images and the new input images belong to somewhat different (shifted) domains.

Example aspects are disclosed that may, in at least some scenarios, enable a trained machine learning model, for example a trained object detection model, to be adapted to perform accurately in a shifted domain.

Figure 1:
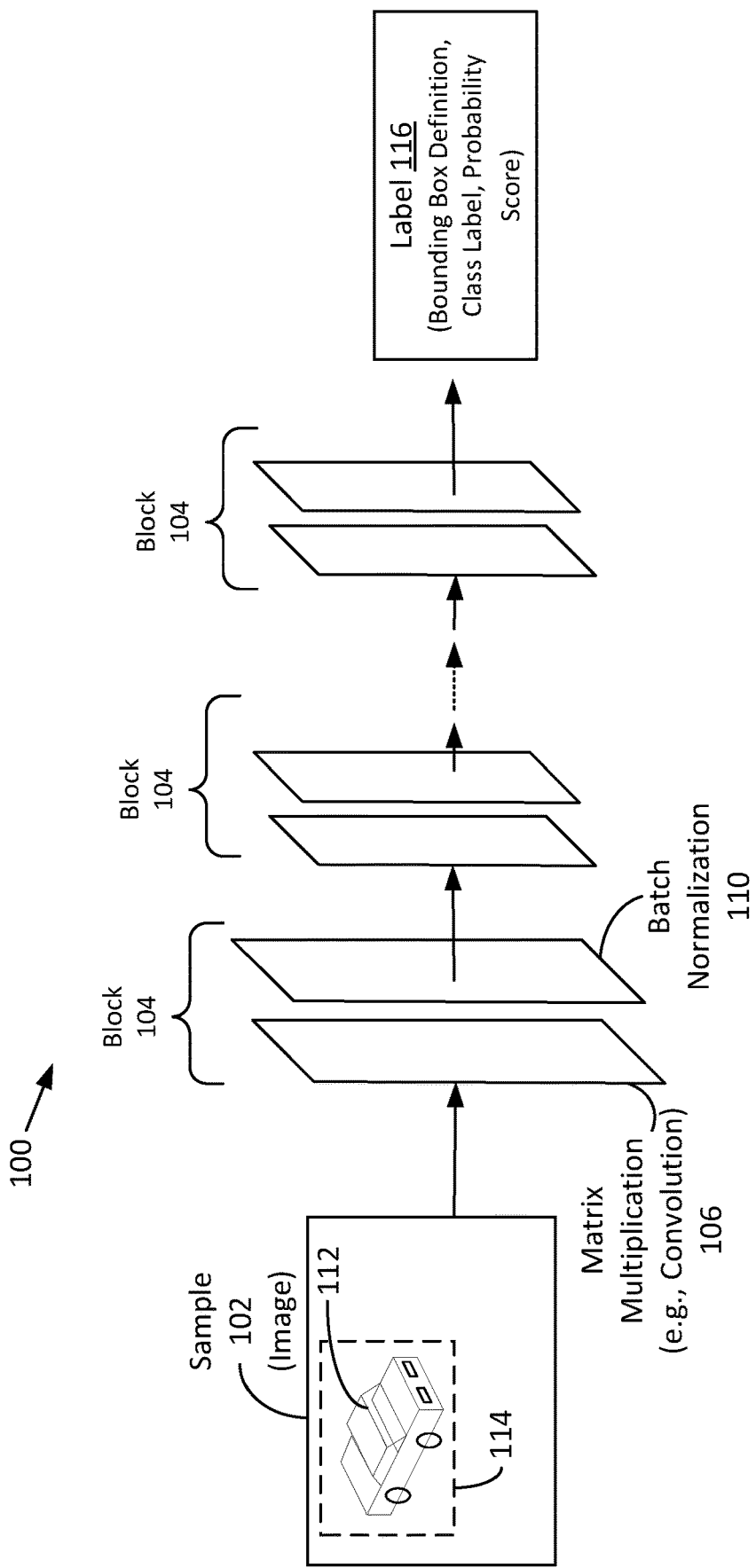
FIG. 1 is a block diagram illustrating an architecture of an object detection model.

For contextual purposes, an illustrative architecture of a trained object detection model is shown in FIG. 1, referred to herein as source model 100. In the illustrated example, source model 100 is a multi-layer deep learning convolutional neural network, and in this regard can include multiple computational blocks 104, each of which includes a respective set of layers 106, 110, each of which are configured to perform a respective set of computational operations. As known in the art, computational blocks 104 can have different configurations and include different layer configurations, and are each configured to process a respective feature map output by a preceding computational block 104.

The illustrated blocks 104 each include matrix multiplication layer 106 that is configured to perform matrix multiplication operations using a set of learned weight parameters. As known in the art, the matrix multiplication layer 106 may for example be a fully connected layer (for example, at an input computational block 104) or a convolution layer (for example, located at each of a plurality of intermediate computational blocks 104). An activation layer may be included to apply a non-linear activation function to outputs generated by the matrix multiplication layer 106. The illustrated blocks 104 also include a batch normalization layer 110, which, as known in the art, can stabilize a neural network during training. Each batch normalization layer 110 is configured by learned batch normalization parameters, for example by a respective pair of parameters commonly referred to as beta and gamma.

Accordingly, the source model 100 is configured by a set of learned parameters $\theta^s_M$ that includes respective weight parameters for each of the matrix multiplication layers 106 (e.g., convolution layers and fully connected layers) and respective pairs of batch normalization parameters for each of the batch normalization layers 110. The set of learned parameters $\theta_M^s$ may for example have been learned using a standard forward pass, back-propagation, gradient decent based supervised training technique using a training dataset that includes multiple labeled training images. The computational blocks 104 can include layers other than or in addition to those shown in FIG. 1, for example pooling layers.

Source model 100 is configured to receive an input image 102, which may for example be an array of pixel data, identify a data object 112 in the input image 102 and generate a respective label 116 for the data object 112 identified in the input image 102. The input image 102 includes a group of pixels that represent a data object 112. Data object 112 corresponds to an object in the input image 102 that can be classified by predicting a class (or category) label from a set of possible candidate class (or category) labels for the data object 112. The generated respective output label 116 can include: (i) a bounding box definition that indicates a location of the data object 112 within the input image 102 (for example, x1, y1, width, height of bounding box 114); (ii) a predicted class (or category) label for the data object 112 (for example, "car", "pedestrian", "cat"); and (iii) a probability score for the predicted class (or category) label (for example 0.86 on a scale of 0 to 1). In some examples, an input image 102 can include multiple data objects 112, and the source model can identify the multiple data objects 112 and generate respective output labels 116 for each of the respective data objects 112.

Figure 2:
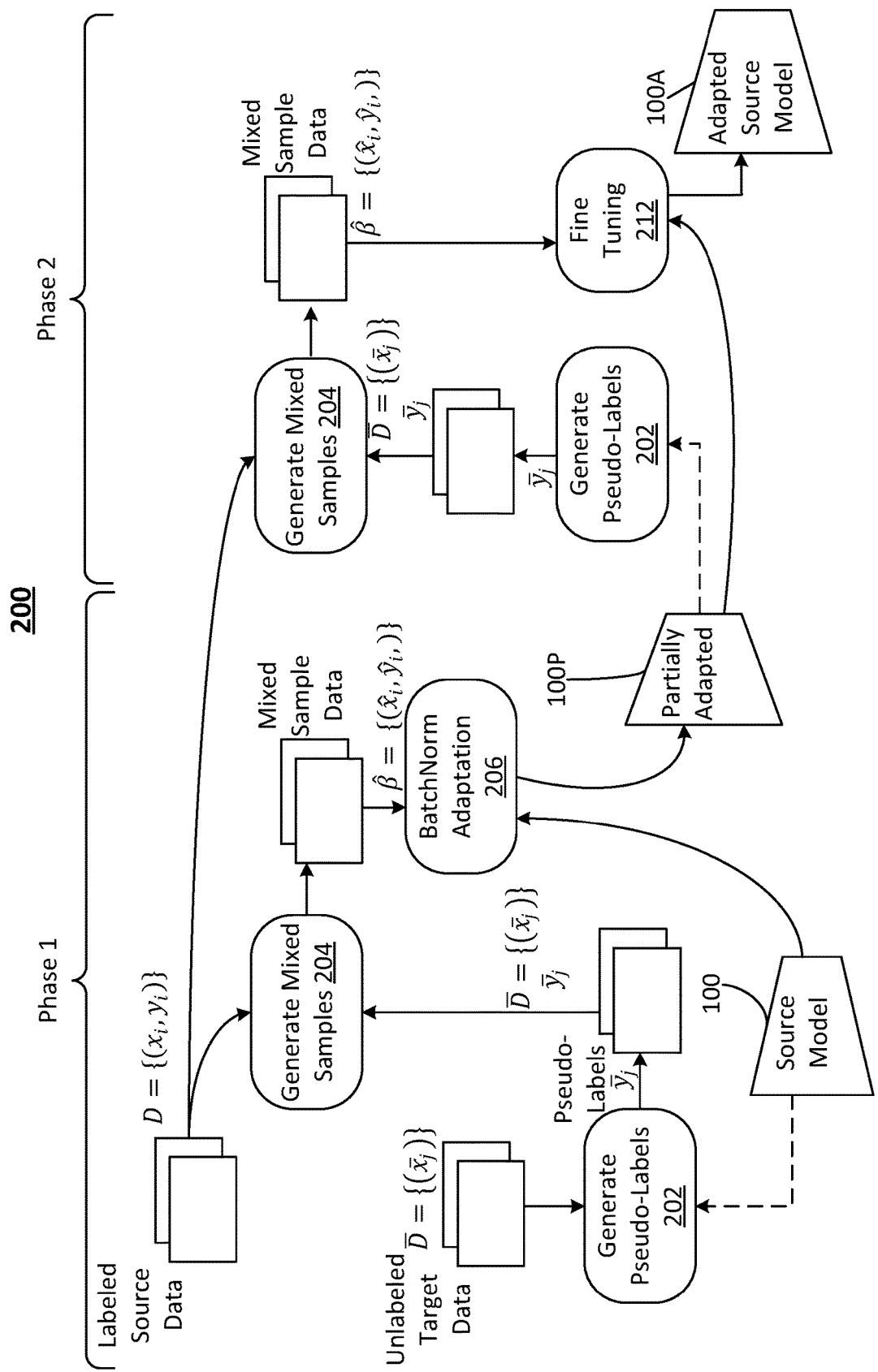
FIG. 2 is a flow diagram illustrating a gradual adaptation method, according to example embodiments.

With reference to FIG. 2, an example of a method 200 for adapting source model 100 for operation in a shifted domain will now be described. Method 200 performs a set of operations to update the set of learned parameters $\theta_M^s$ to provide a set of adapted parameters $\theta_M^\alpha$ that can be used to configure the source model 100 so that it can perform well in both the source domain and the target domain, and thus improve the robustness of the source model 100 to the domain shift. As will be apparent from the following description, method 200 is designed to address two inter-related issues, namely that, (i) the unlabeled target dataset $\overline{D}=\{(\overline{x}_j)\}$ does not come with ground-truth labels, and (ii) generating pseudo-labels target dataset $\overline{D}=\{(\overline{x}_j)\}$ with the set of learned parameters $\theta_M^s$ will result in noisy supervision due to the domain shift, and thus hinders adaptation of the source model 100 to account for domain shift.

Method 200 includes a first phase (Phase 1) for performing a coarse adaptation of the set of learned parameters $\theta_M^s$ to generate a set of coarsely adapted parameters and a second phase (Phase 2) for performing fine tuning of the set of coarsely adapted parameters. Each phase is performed for a respective set of adaptation epochs (e.g., w epochs for Phase 1 and T-w epochs for Phase 2) with a respective mixed dataset batch $\hat{\beta}=\{(\hat{x}_i,\hat{y}_i)\}$ (described in detail below) being generated for each epoch.

As noted above, source model 100 is configured with the set of learned parameters $\theta_M^s$ to perform an object detection task. Source model 100 has been trained using a supervised learning algorithm and a source training dataset $D=\{(x_i,y_i)\}$ of data elements $(x_i,y_i)$ obtained for a source domain, where $x_i$ is an source image (e.g., a source image sample) and $y_i$ is a set of labels for source data objects that are present in the source image. The label for each source data object includes a class label (also referred to as object category label) and a bounding box definition (also referred to as bounding box coordinates). In an example scenario, the method of FIG. 2 is applied to adapt the source model 100 where a covariate shift occurs between the distribution of source training dataset $D=\{(x_i,y_i)\}$ and the distribution of target image samples that will be collected for a target domain in which the source model 100 will be implemented.

The method 200 receives, as inputs, the labeled source training dataset $D=\{(x_i,y_i)\}$ as well as an unlabeled target dataset $\overline{D}=\{(\overline{x}_j)\}$, where $x_j$ is a target image sample from the target domain. In some examples, method 200 also receives, as inputs, a pre-trained source object detection model 100 (also referred to as the "source model 100") having a specified architecture (e.g., number, type and order of computation blocks 104, including number, type and order of layers within the computation blocks 104, as well as hyper-parameters for the source model) and the set of learned parameters $\theta_M^s$.

In an alternative example, method 200 does not receive the set of learned parameters $\theta_M^s$, but rather includes a preliminary step (not shown in FIG. 2) of using the labeled source training dataset $D=\{(x_i,y_i)\}$ and a supervised learning algorithm to learn the set of learned parameters $\theta_M^s$ for source model 100.

As noted above, a respective mixed dataset batch $\hat{\beta}=\{(\hat{x}_i,\hat{y}_i)\}$ is generated for each epoch. The generating of a mixed dataset batch $\hat{\beta}=\{(\hat{x}_i,\hat{y}_i)\}$ will now be described in the context of a first epoch of the first phase (Phase 1). As a first step, a pseudo-label generator operation 202 is applied to unlabeled target dataset $\overline{D}=\{(\overline{x}_j)\}$ to generate a set of respective pseudo-labels $\{\overline{y}_j\}$. The pseudo-label generator operation 202 uses the source model 100 with the set of learned parameters $\theta_M^s$ to generate the respective pseudo-labels $\{\overline{y}_j\}$ for target data objects included in the target image samples $\{\overline{x}_j\}$. Each pseudo-label $\overline{y}_j$ includes a predicted target class (or object category) label and a bounding box definition for the target data object. In some examples, the pseudo-label $\overline{y}_j$ can also include a probability value for the predicted target class label.

The currently illustrated embodiment is described in the context of a single source data object (and corresponding source label) per source image sample and single source target object (and corresponding target pseudo-label) object per target image sample, however, it will be appreciated that the source model 100 can identify multiple data objects a single source image sample and generate a respective label for each identified data object in the single source image sample. The methods and systems disclosed can be adapted to use multiple data objects per source and target image sample.

In a second step, a mixed sample generator operation 204 is applied to generate mixed dataset batch $\hat{\beta}=\{(\hat{x}_i,\hat{y}_i)\}$ of mixed data elements that each include: (i) a mixed image sample $\hat{x}_i$ including at least one source data object from one of the source image samples $x_i$ and at least one target data object from one of the target image samples $\bar{x}_j$, and (ii) the corresponding source class label for the source data object and the corresponding target class label for the target data object.

In an example embodiment, mixed sample generator operation 204 is configured to uniformly sample image samples from both the source and target image domains (e.g., source and target datasets $D \cup \overline{D}$) and mix the data objects from respective image samples into a domain-mixed composite image sample $\hat{x}_i$ that includes a set of labels $\hat{y}_i$ for each data object in the domain-mixed composite image sample $\hat{x}_i$. Mixed sample generator operation 204 is graphically illustrated in FIG. 3 for generating a single mixed data element $(\hat{x}_i, \hat{y}_i)$ as described in further detail below. A pseudocode representation of mixed sample generator operation 204 is provided in FIG. 4 for generating dataset batch $\hat{\beta} = \{(\hat{x}_i, \hat{y}_i)\}$ of mixed data elements.

Figure 3:
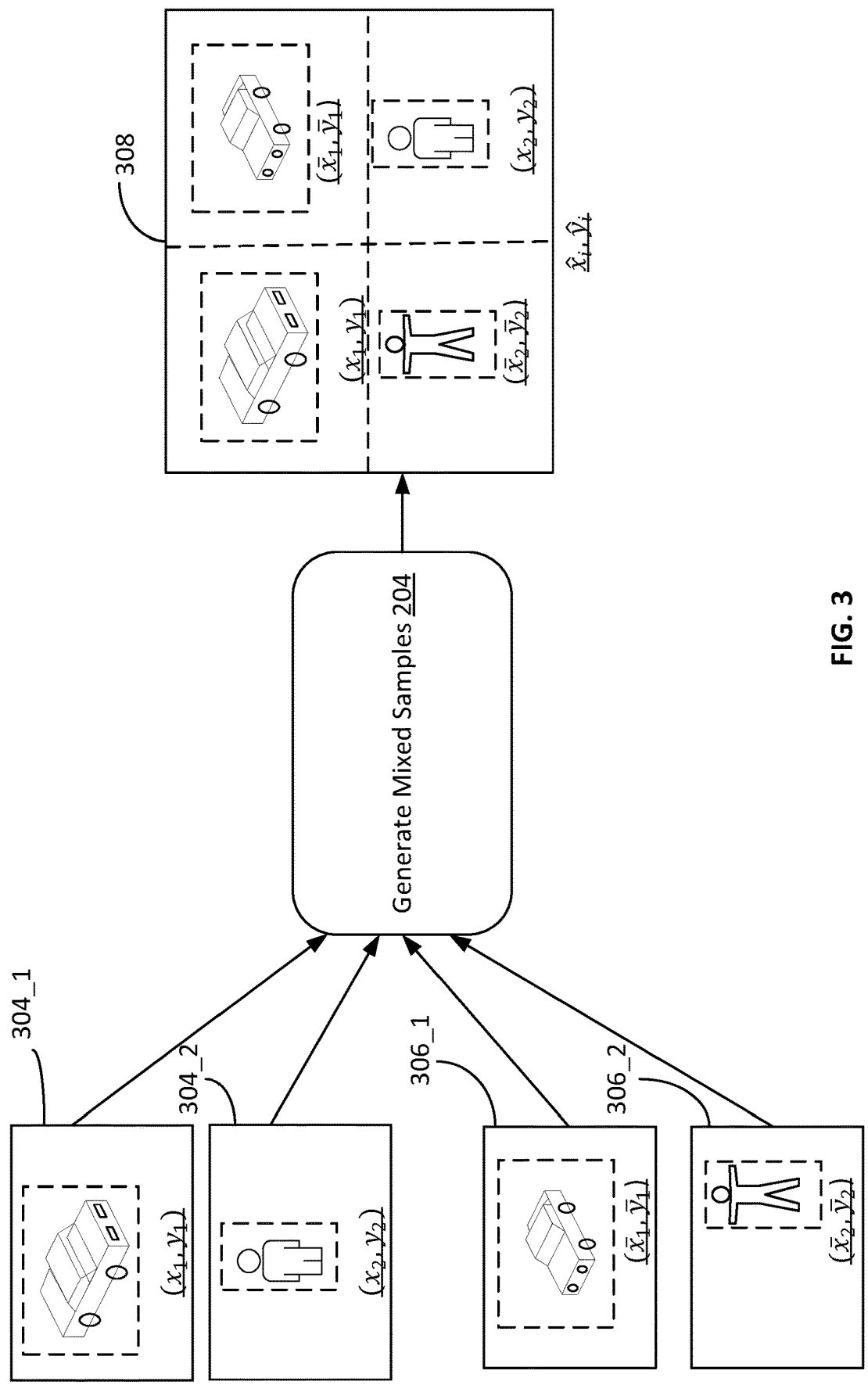
FIG. 3 is a diagram illustrating an operation for generating mixed image samples, according to example embodiments.

As indicated in FIG. 3, mixed sample generator operation 204 randomly samples labeled source training dataset D={$(\hat{x}_i, \hat{y}_i)$} to select source image $x_1$ (which has corresponding source label $y_1$). Mixed sample generator operation 204 then randomly samples additional image samples (e.g., $x_2, \bar{x}_1, \bar{x}_2$ from the source and target datasets $D \cup \overline{D}$ to create a new domain-mixed composite image sample $\hat{x}_i$. The corresponding source labels $y_1, y_2$ and target pseudo-labels $\bar{y}_1, \bar{y}_2$ are collated into a label set $\hat{y}_i$ for the new domain-mixed composite image sample $\hat{x}_i$. In an example embodiment, the respective data object and a surrounding image portion in the respective source and target image samples are cropped and the cropped image portions stitched together to form the new domain-mixed composite image sample $\hat{x}_i$. In at least some examples, one or more of the cropped images are scaled (e.g., in the case of down scaling, data from a larger set of pixels are combined using a known scaling algorithm into a smaller set of pixels). The respective bounding box definitions corresponding to the source and target images are computed based on the relative positions of each cropped image portion in the domain-mixed composite image sample $\hat{x}_i$.

In the illustrated example of FIG. 3, portions of source image samples 304_1 and 304_2 are cropped and positioned in the top left and bottom right quarter portions of a new domain-mixed composite image sample 308; portions of target image samples 306_1 and 306_2 are cropped and positioned in the top right and bottom left quarter portions of the new domain-mixed composite image sample 308. Accordingly, domain-mixed composite image sample 308 is a collage of cropped portions from four image samples that have been randomly sampled from the source and target datasets $D \cup \overline{D}$. In other examples, the number of data objects integrated into the new domain-mixed composite image sample 308 could be greater than or less than 4. The label set $\hat{y}_i$ for the new domain-mixed composite image sample $\hat{x}_i$ will include: (i) the respective class labels for each of the data objects that have been cropped from source image samples, along with their respective adjusted bounding box definitions; and (ii) the respective pseudo-class labels for each of the data objects that have been cropped from target image samples, along with their respective adjusted bounding box definitions.

In examples, a weighted balanced sampler is used by mixed sample generator operation 204 to uniformly sample image samples from the source and target datasets $D \cup \overline{D}$.

The mixed sample generator operation 204 may mitigate domain shift and label noise in a number of ways:

Mixed sample generator operation 204 can produce a diverse set of images samples by randomly sampling source and target image samples from the source and target dataset datasets $D \cup \overline{D}$ and mixing crops from different combinations of source and target images samples. This can enable different domain-mixed composite image samples to be generated for multiple epochs, thus increasing the effective number of training samples in the training dataset used to train the source model 100 and preventing overfitting.

Mixed sample generator operation 204 can be implemented in a data-efficient manner by using a weighted balanced sampling source and target image samples from both the source and target domains. This can aid in adaptation of the source model 100 so that the adapted source model is robust to data shifts even if the target dataset has limited target image samples or the source and target datasets are highly imbalanced.

Mixed sample generator operation 204 mixes ground-truth source labels and target pseudo-labels in the same mixed data element. This can mitigates the effect of false labels during adaptation of the source model 100 (described below) because the mixed data element always contains accurate labels from the source dataset.

Further, the use of mixed sample generator operation 204 can enforce the source model 100 that is being adapted to detect small objects as the data objects in the source samples can be scaled down in the mixed images.

Referring again to FIG. 2, in Phase 1 of method 200, the dataset batch $\hat{\beta} = \{(\hat{x}_i, \hat{y}_i)\}$ of mixed data elements is then used to perform a course adaptation epoch of the set of learned parameters $\theta_M^s$ of the source model 100. In particular, for an initial set of adaptation epochs (for example w epochs), only a subset of the set of learned parameters $\theta_M^s$ are adjusted in each adaptation epoch. In the illustrated example, the parameters for all network layers in the source model 100 are frozen with the exception of the parameters of the batch normalization layers 110. In this regard, method 200 includes a BatchNorm adaptation operation 206 that is configured to exclusively adapt the beta and gamma parameters of the source model 100. In this regard, BatchNorm adaptation operation 206 is configured to use mixed dataset batch $\hat{\beta} = \{(\hat{x}_i, \hat{y}_i)\}$ for an adaptation epoch in which only the parameters of the batch normalization layers 110 of the source model 100 are updated. BatchNorm adaptation operation 206 can apply known model training techniques to update the parameters of the batch normalization layers over a plurality of forward pass, loss calculations and back propagation iterations in order to minimize a loss function output in respect of the dataset batch $\hat{\beta} = \{(\hat{x}_i, \hat{y}_i)\}$. The source model 100 can then be used with the updated parameters of the batch normalization layers (and original parameters of all other layers of the source model 100) by generate pseudo label operation 202 to provide a new set of pseudo-labels for the target image sample dataset $\overline{D} = \{(\bar{x}_j)\}$, which are then used by generate mixed sample operation 204 to generate a further dataset batch $\hat{\beta} = \{(\hat{x}_i, \hat{y}_i)\}$ for another round of BatchNorm adaptation training by BatchNorm adaptation operation 206. At the end of the m epochs of course training, partially adapted source model 100P version of source model 100 will have been trained. In particular a set of partially adapted parameters $\theta_M^s$ will have been learned that will include the same weight parameters for matrix multiplication layers 106 as the set of learned parameters $\theta_M^s$ but will include updated beta and gamma parameters for the batch normalization layers 110.

Phase 2 of the method 200 is similar to Phase 1 with the exception that BatchNorm adaptation operation 206 is replaced with a fine tuning adaptation operation 212. In particular, the previously frozen layers of the source model 100 are unfrozen such that all of the parameters in the set of partially adapted parameters $\theta_M^P$, including the parameters for matrix multiplication layers 106, can be adapted during the T-w adaptation epochs of Phase 2. Fine tuning adaptation operation 212 can apply known model training techniques to update all layer parameters over a plurality of forward pass, loss calculation and back propagation iterations in order to minimize a loss function output in respect of each epoch dataset batch $\hat{\beta}=\{(\hat{x}_i,\hat{y}_i)\}$.

Thus, during a first epoch of Phase 2, the partially adapted source model 100P with the set of partially adapted parameters $\theta_M^P$ is used by generate pseudo label operation 202 to provide a new set of pseudo-labels for the target image sample dataset $\overline{D}=\{(\overline{x}_j)\}$, which are then used by generate mixed sample operation 204 to generate a further dataset batch $\hat{\beta}=\{(\hat{x}_i,\hat{y}_i)\}$ for a round of fine tuning adaptation training by fine tuning adaptation operation 212. The process of fine tuning to update the partially adapted source model 100P with the set of partially updated parameters $\theta_M^P$, generating new pseudo-labels using an updated model (e.g. a fine-tuned model) with the set of adapted parameters, and generating further dataset batches $\hat{\beta}=\{(\hat{x}_i,\hat{y}_i)\}$ for further fining tuning adaptation operations 212 is repeated until the completion of the T-m epochs, resulting in an adapted source model 100A that is configured with the set of adapted parameters $\theta_M^\alpha$.

In summary, method 200 applies a gradual adaptation approach for adaptation of an object detection model to account for domain shift, such as source model 100. In a first phase, all matrix multiplication layers (e.g., convolutional layers) are frozen and only the parameters of batch normalization layers are adapted for a first set of w epochs. After this first phase, the partially adapted model is then used to generate more accurate pseudo-labels. In the second phase, all layers are unfrozen and then fine-tuned using the refined pseudo labels. During these two phases, mixed domain image samples are used for the adaptation training.

FIG. 5 shows a pseudocode representation of the gradual adaptation method 200 of FIG. 2.

FIG. 6 provides a flow chart summarizing an example of the method 200. The method 200 begins at block 602. At block 602, a plurality of labeled data elements are received. Each labeled data element includes: (i) a source sample (e.g., source images) including a respective source data object, and (ii) a corresponding source class label for the respective source data object. The method then proceeds to block 604. At block 604, a plurality of target samples (e.g., target images) are received. Each target sample includes a respective target data object. The method 200 then proceeds to block 606. At block 606, the method 200 predicts, for each of the plurality of targets samples, using a machine learning model (e.g. object detection model) configured by a current set of configuration parameters, a corresponding target class label for the respective target data object included in the targets sample. The method 200 then proceeds to block 608. At block 608, a plurality of labeled mixed data elements is generated. Each labeled mixed data element includes (i) a mixed sample including a source data object from one of the source samples and a target data object from one of the target samples, and (ii) the corresponding source class label for the source data object and the corresponding target class label for the target data object. The method 200 then proceeds to block 610. At block 610, the method 200 finely, adjusts the current set of configuration parameters to minimize a loss function for the machine learning model (e.g. the object detection model) for the plurality of labeled mixed data elements. In some examples, for an initial set of model adaptation epochs, only parameters of the BatchNorm layers of the machine learning model (e.g. the object detection model) are adjusted, after which configuration parameters for all other layers are adjusted. The method then proceeds to block 612 where blocks 608 to 610 are repeated for a plurality of model adaptation epochs and the final adjusted set of the configuration parameters are output as configuration parameters of the machine learning model (e.g. the object detection model).

Figure 7:
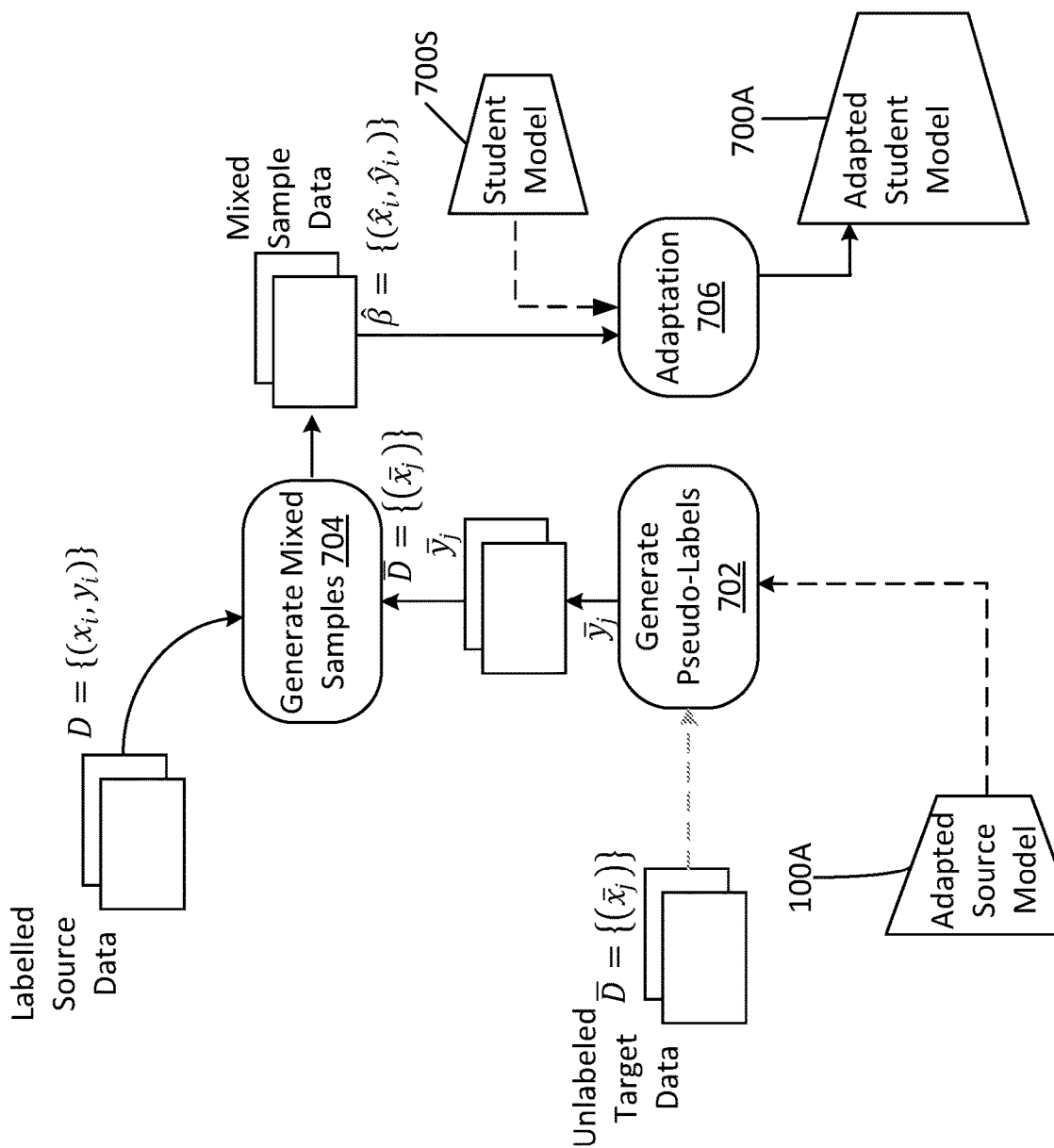
FIG. 7 is a flow diagram illustrating operations that can be added to the gradual adaptation method to adapt a student model, according to example embodiments.

As noted above, in the illustrated example, the adapted source model 100A has the same network architecture as the source model 100, but is configured with the set of adapted parameters $\theta_M^\alpha$. In some scenarios, it may be desirable to use an object detection model in a shifted domain that has a different model architecture than that of the source model 100. For example, a simplified model that can run on a computationally constrained edge device may be desired. According to example embodiments, the method 200 can be applied with additional steps to apply domain shift adaptation to a further model that has a different model architecture than source model 100. With reference to FIG. 7, in a further example of the disclosure, the adapted source model 100A, as configured with the set of adapted parameters $\theta_M^\alpha$, that is output by adaptation method 200 is used as part of the training of a further machine learning model, referred to hereafter as student model 700S. In an example embodiment, student model 700S has a smaller and less complex neural network architecture than that of source model 100. For example, student model 700S may be a smaller, faster model in that it has fewer computation blocks 104 (and thus fewer layers 106, 110) than source model 100. In the illustrated example, the student model 700S has already been trained to emulate the operation of original source model 100, and is configured by a set of learned parameters $\theta_{SM}^s$. For example, student model 700S may have been trained using a supervised machine learning algorithm and the same labeled training source dataset D={$(x_i,y_i)$} (or a subset thereof) as source model 100. However, there is a desire to enable the student model 700S to perform in a shifted domain relative to that of source dataset D={$(x_i,y_i)$}. One option is just to use the student model 700S as a source model and adapt it directly using the gradual adaptation method 200 without further steps. However, the smaller the model the less accurate the gradual adaptation method 200 may be in providing an appropriate domain shift model adaptation. Accordingly, in the illustrated example of FIG. 7, a larger model (e.g., source model 100) is adapted for the domain shift using the adaptation method 200. The resulting adapted source model 100A, as configured with the set of adapted parameters $\theta_M^\alpha$, is then used for domain adaptation of the student model 700S. In particular, the adapted source model 100A is used by a pseudo-label generator operation 702 (which functions in the same manner as pseudo-label generator operation 202 described above) to generate pseudo-labels {$\overline{y}_j$} for target objects of target image samples included in target domain dataset $\overline{D}=\{(\overline{x}_j)\}$. A mixed sample generator operation 704 (which functions in the same manner as mixed sample generator operation 204 described above) samples, crops and combines data from labeled source dataset source dataset D={$(x_i,y_i)$}, target domain dataset $\overline{D}=\{(\overline{x}_j)\}$ and pseudo-labels {$\overline{y}_j$} to provide mixed sample batch $\hat{\beta}=\{(\hat{x}_i,\hat{y}_i)\}$.

The mixed sample batch $\hat{\beta}=\{(\hat{x}_i,\hat{y}_i)\}$ is then supplied as training dataset, together with the student model 700S, to an adaptation operation 706 that learns a set of adapted student parameters $\theta_{SM}^\alpha$ for an adapted student model 700S. Adaptation operation 706 may for example function in the same manner as fine tuning operation 212 described above.

Accordingly, in examples the disclosed methods and systems can adapt both small and large object detection models to domain shifts since are larger model can be first adapted and then used to fine tune a smaller model to produce high quality pseudo-labels even when the student model is small. Further, a teacher model and student model do not need to share the same architecture. Thus, it is possible to use a slow but accurate teacher model for the purpose of adaptation while choosing a faster student model architecture for deployment.

In the above described examples the object detection model performs an object detection task in respect of camera images that are image frames captured by a light-intensity image sensor such as a video camera. In alternative embodiments, the same methods can be applied to adapt an object detection model that operates using Light Detection and Ranging (LIDAR) images, in which case the source samples and target samples are LIDAR images rather than camera images.

Further examples and configurations will be now be described. In an example, shown in FIG. 8, a two phase adaptation method is also used for domain adaptation of a trained object detection model. It will be appreciated that in the present disclosure, the trained object detection model is a trained neural network model that has an architecture as described herein. In the first phase, the method updates the parameters of convolutional layers of a trained object detection model, and further trains the trained object detection model with labeled training data (e.g. labeled images) generated by a domain mix module (for example DomainMix module 804 in FIG. 8). During further training of the trained object detection model, only parameters of batch normalization (BatchNorm) layers of the trained object detection are updated. The domain mix module 804 mixes the labeled image and unlabeled image in the batch set. In the first phase, the method also generates pseudo-labels (e.g., using a pseudo-label generator module 802) for the unlabeled images using the prediction output by the further trained (e.g. partially adapted) object detection model. The pseudo-labels are generated by executing the partially adapted model on the unlabeled images and by collecting the detected object's bounding box coordinates, classification scores and the predicted object classes (i.e. categories). In the second phase, the trained object detection model is fine-tuned by further training the trained object detection model using the images of the training dataset and the labeled target images.

Figure 9:
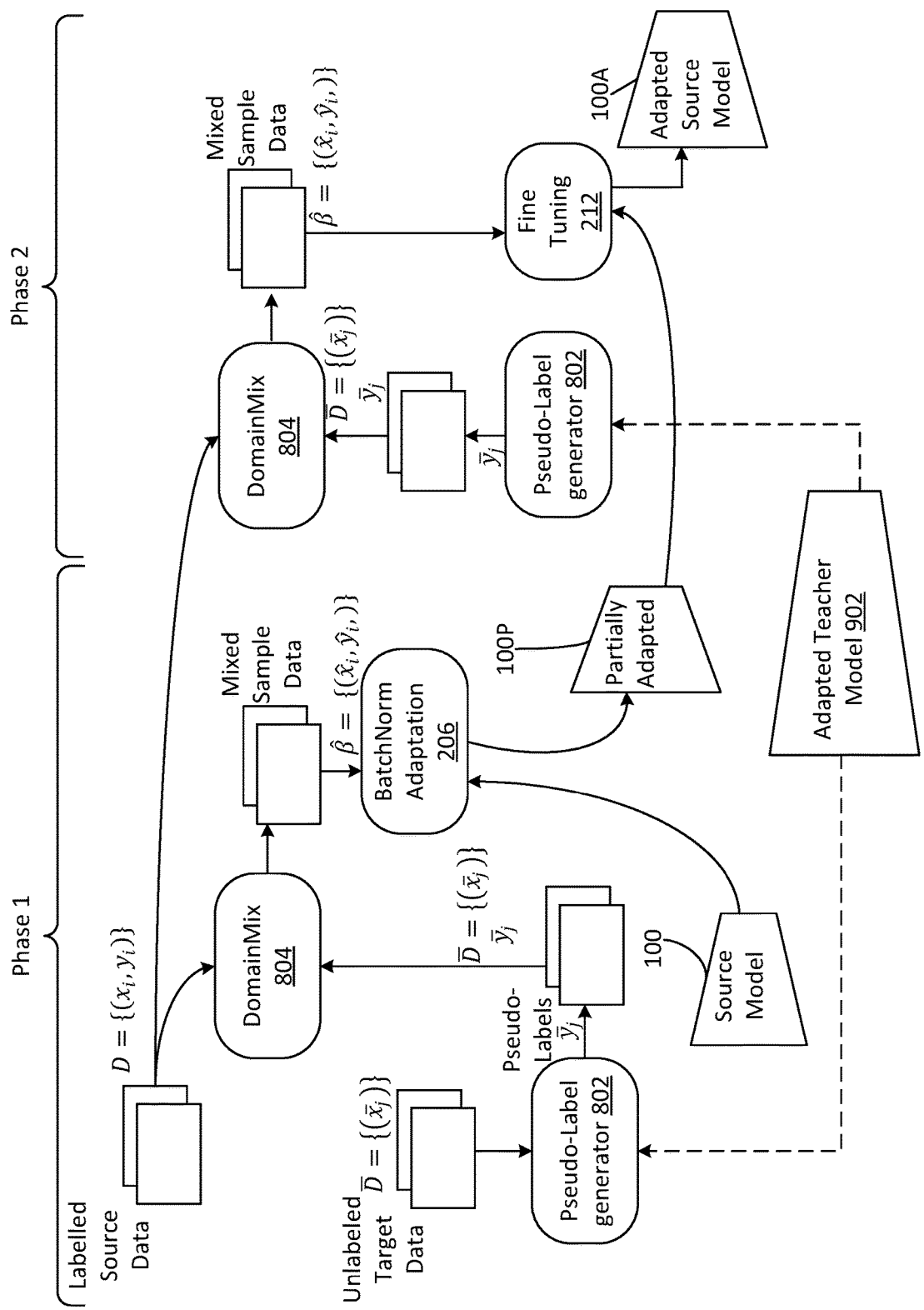
FIG. 9 is a flow diagram illustrating operations of a further example of a gradual adaptation method, according to example embodiments.

Optionally, as shown in FIG. 9, the method can be used for teacher-guided pseudo-label refinement which includes first training a large object detection model (i.e. a teacher object detection model) using a labeled source training dataset. The large object detection model is adapted using the steps described in the previous paragraph, to provide adapted large object detection model 902 (i.e. an adapted teacher object detection model). Pseudo-labels generated for the unlabeled target images using the large object detection model 902 are used as checkpoints. A small object detection model (i.e. a student object detection model) is adapted using these new pseudo-labels when applying the steps described in the previous paragraph. The teacher-guidance method is optional and it is beneficial only for adapting small object detection models.

The method of FIG. 8 can be summarized as follows. Given a source object detection model $\theta$ that is trained on a clean and labeled set $D=\{(x_i,y_i)\}$ of image-target pairs and an unlabeled set $\overline{D}=\{(\overline{x}_j)\}$ of corrupted images from a target domain, the task is to adapt the source object detection model $\theta$ and improve the robustness of the source object detection model $\theta$ to domain shift caused by image corruptions. The goal is to obtain an adapted object detection model that can achieve good performance on both the set of clean test images and the unlabeled set of corrupted images from the target domain. To do that, two core issues must be resolved. The first issue is that the target training set $\overline{D}=\{(\overline{x}_j)\}$ does not include ground-truth labels. The second issue is that generating noisy pseudo-labels directly with the source object detection model $\theta$ leads to poor training that hinders the adaptation of the source objected detection model $\theta$.

Figure 8:
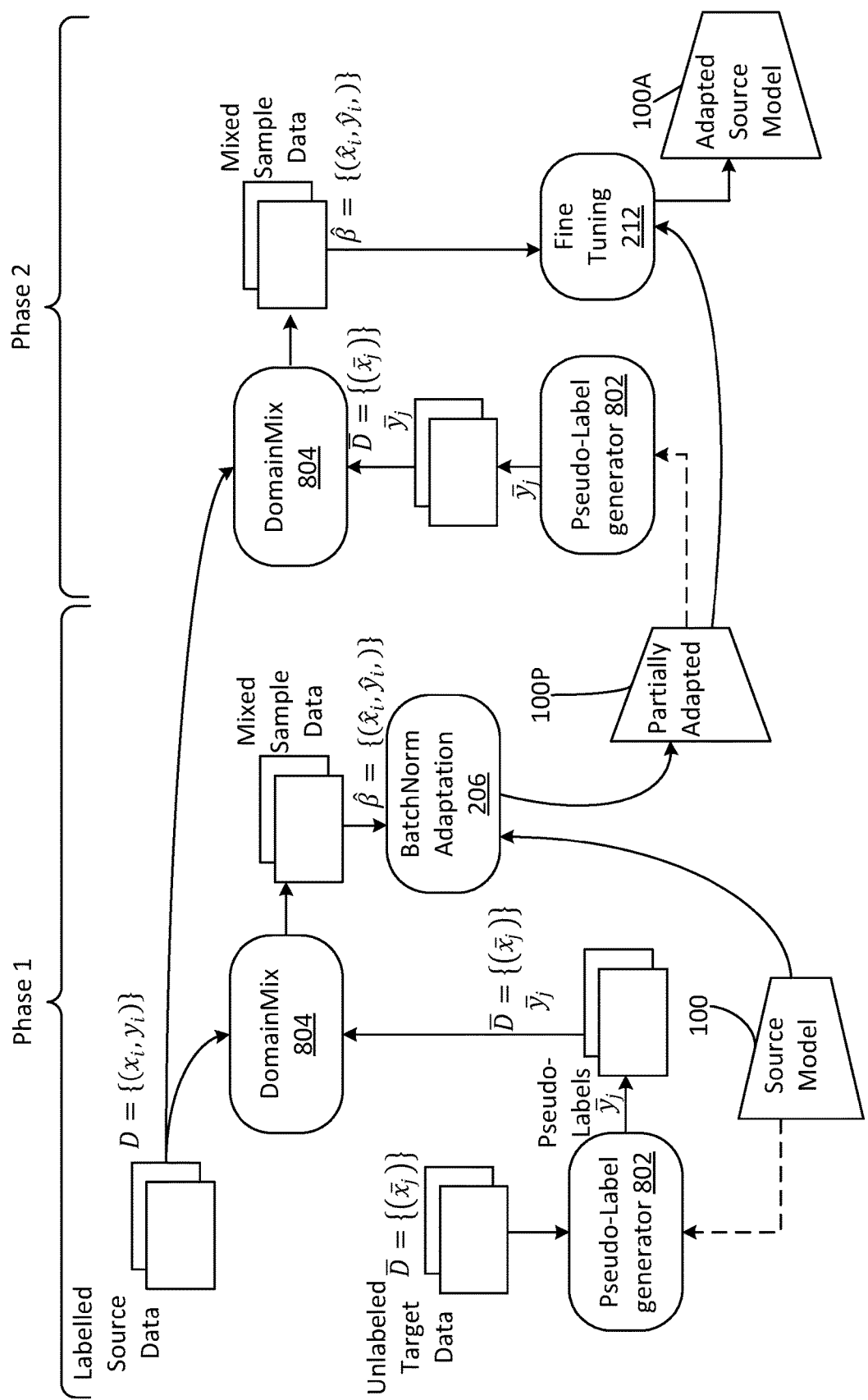
FIG. 8 is a flow diagram illustrating operations of a further example of a gradual adaptation method, according to example embodiments.

A system for implementing the method of FIG. 8 includes a pseudo-label generator, an adaptation-centric augmentation module (referred to as DomainMix augmentation module), and a model adapter (e.g., Batch Norm Adaption operation 206 and Fine tuning operation 212). The pseudo-label generator 802, the DomainMix augmentation module 804, and the model adapter operate together to perform domain adaptation on a trained source object detection model.

The pseudo-label generator 802 (which may for example be implemented using pseudo-label generation operation 202) executes an object detection model checkpoint onto an unlabeled image $\overline{x}_j$ in $\overline{D}=\{(\overline{x}_j)\}$ from the target domain and outputs pseudo-labels $\{\overline{y}_j\}$, which is a set of detected object categories and bounding boxes.

The DomainMix augmentation module 804 receives random samples from the labeled source training dataset (e.g. labeled images) and target data from the unlabeled target dataset (e.g. unlabeled images) $D \cup \overline{D}$ and collates randomly sampled images (e.g., portions from four images) into a new image in the form of a collage and also combines the pseudo-labels and ground-truth labels of these images. These four images are uniformly sampled from the labeled source training dataset and unlabeled target dataset $D \cup \overline{D}$ to ensure the effectiveness of the method of the present disclosure. By sampling uniformly from the source and target domains, the method ensures that each image contain features from these domains even when the source and target datasets are imbalanced. For the unlabeled images sampled from the unlabeled target dataset, the pseudo-label generator provides the pseudo-labels to be mixed with the ground-truth labels of the labeled images of the labeled source dataset. As a result, the DomainMix augmentation module 804 mitigates the effect of noisy labels of the target domain samples during training because the mixed-image always contain accurate labels from the source domain. Finally, the DomainMix augmentation module 804 enforces the object detection model to detect small objects since the sizes of the objects in the original images are scaled down after the augmentation.

The model adapter (e.g., implemented by batch norm adaptation operation 206 and fine tuning operation 212) coordinates the two-phase method for domain adaptation of a trained object detection model. The model adapter may be considered to be a model trainer. Its role is to take the training samples obtained with DomainMix augmentation module 804 and update the parameters of the batch norm layers during the first phase of the method of the present disclosure. In the second phase, the method uses new domain-mixed training samples with refined pseudo-labels and updates the parameters of all convolutional layers and batch norm layers of the neural network that approximates the object detection model.

Thus, DomainMix augmentation module 804 performs a data augmentation method which adapts the feature representations generated by the trained object detection model to perform well on both the source domain and target domain. The data augmentation method generates new training images by randomly sampling images drawn from both a source domain data and a target domain data, and by mixing four sampled images at a time to create new mixed images. The random sampling is done with a weighted balanced sampler to handle the general case of unbalanced data, resulting in a data augmentation method that is effective even when the number of images from target domain is much less than that from the source domain. Furthermore, the data augmentation method transforms and collates the ground-truth labels of the source domain images with the pseudo-labels generated on the target domain images. The operations performed by the data augmentation method are shown in Algorithm 2 of FIG. 10.

The data augmentation method performed by the DomainMix augmentation module 804 can, in some scenarios, have the following advantages. First, the data augmentation method explicitly adapts the learned feature representations of the trained object detection model by collating the source domain images and target domain images. Second, mixing the ground-truth labels and pseudo-labels strengthens the training supervision of the trained object detection model and prevents the object detection model from becoming unstable during further training. Third, the data augmentation method of the present disclosure reduces the scale of objects in original training images. As a result, the data augmentation method helps the trained object detection model to detect smaller objects and generate higher quality pseudo-labels.

The pseudo-label generator 802 does not rely on the availability of ground-truth annotations for the target domain images. Instead, target domain images are provided to the pseudo-label generator 802 to extract pseudo-labels which are then mixed with the ground-truths labels from source images of the source domain training dataset. Improving the accuracy of the pseudo-labels over the adaptation process is desired because noisy pseudo-labels lead to poor supervision and degenerate the performance of the domain adapted object detection model. Therefore, the original pseudo-labels are used only when updating the Batch Norm layers of a neural network that approximates the object detection model in the first phase of the method of FIG. 8. After that, the pseudo-labels are re-generated and refined using the object detection model with partially adapted model learnable parameters and the unlabeled target domain images. FIG. 11 is a pseudocode representation of the method of FIG. 8

Referring to FIG. 9, in some embodiments, a larger domain adapted teacher object detection model may be used to provide higher-quality pseudo-labels for a smaller domain adapted object detection model. The domain adaptation method of the present disclosure may be first used to dolman adapt a trained teacher object detect model. Then, the adapted teacher objected detection model may be used to generate the pseudo-labels for domain adapting a trained student object detection model. Using a larger adapted teacher object detection model may be used to provide higher-quality pseudo-labels for a smaller domain adapted object detection model is advantageous when the student object detection model is too small to learn accurate pseudo-labels.

Figure 12:
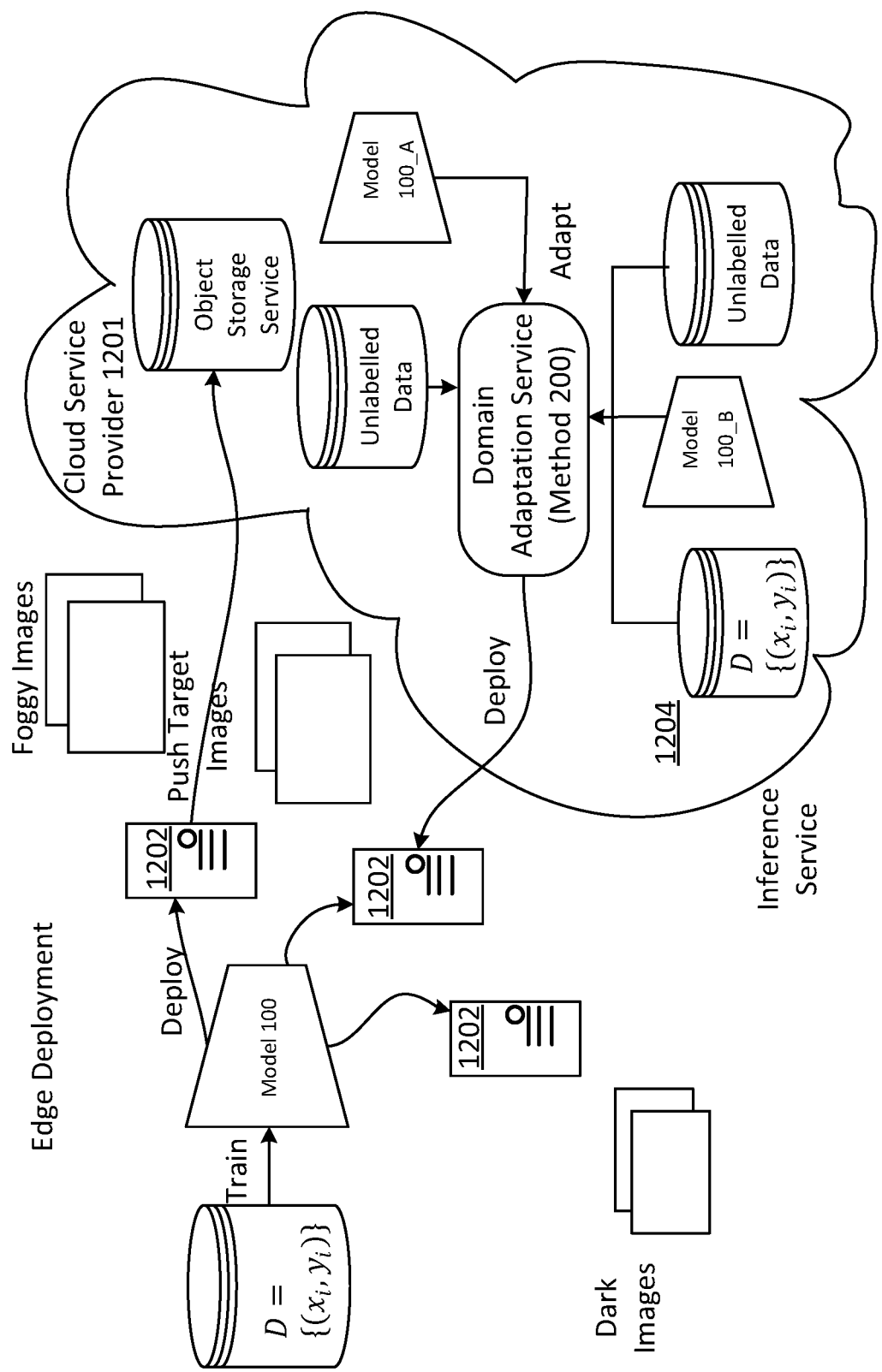
FIG. 12 is schematic representation of a an environment in which the gradual adaptation methods disclosed herein can be applied, according to example embodiments.

Referring to FIG. 12, a domain adaptation service is shown that implements the method of domain adaptation of a trained object detection model of the present disclosure. The domain adaptation service is a software-as-service provided through a network that can include the Internet by a cloud computing service provider 1201. A trained object detection model 100 as shown in FIG. 12 is deployed to various edge computing devices 1202. Each edge computing device 1202 may communicate through the Internet with a domain adaptation service hosted by cloud computing service provider 1201 to perform domain adaptation on its trained object detection model 100 to obtain an adapted object detection model (e.g., model 100_A for one edge computing device 1202, model 100_B for a further edge computing device 1202 as described above. In a further example, the adapted object detection models 100_A, 100_B are stored by cloud computing service provider 1201 in a cloud network 1204 and access to such models is offered as an inference service.

In other embodiments, a computing device, such as one or more physical or virtual machines, may store instructions of software that implements the method of adaptation of a trained object detection model to account for domain shift of the present disclosure. Execution of the instructions of the software by one or more processors of the one or more physical or virtual machines causes the one or more physical or virtual machines to perform method of domain adaptation of a trained object detection model of the present disclosure.

Figure 13:
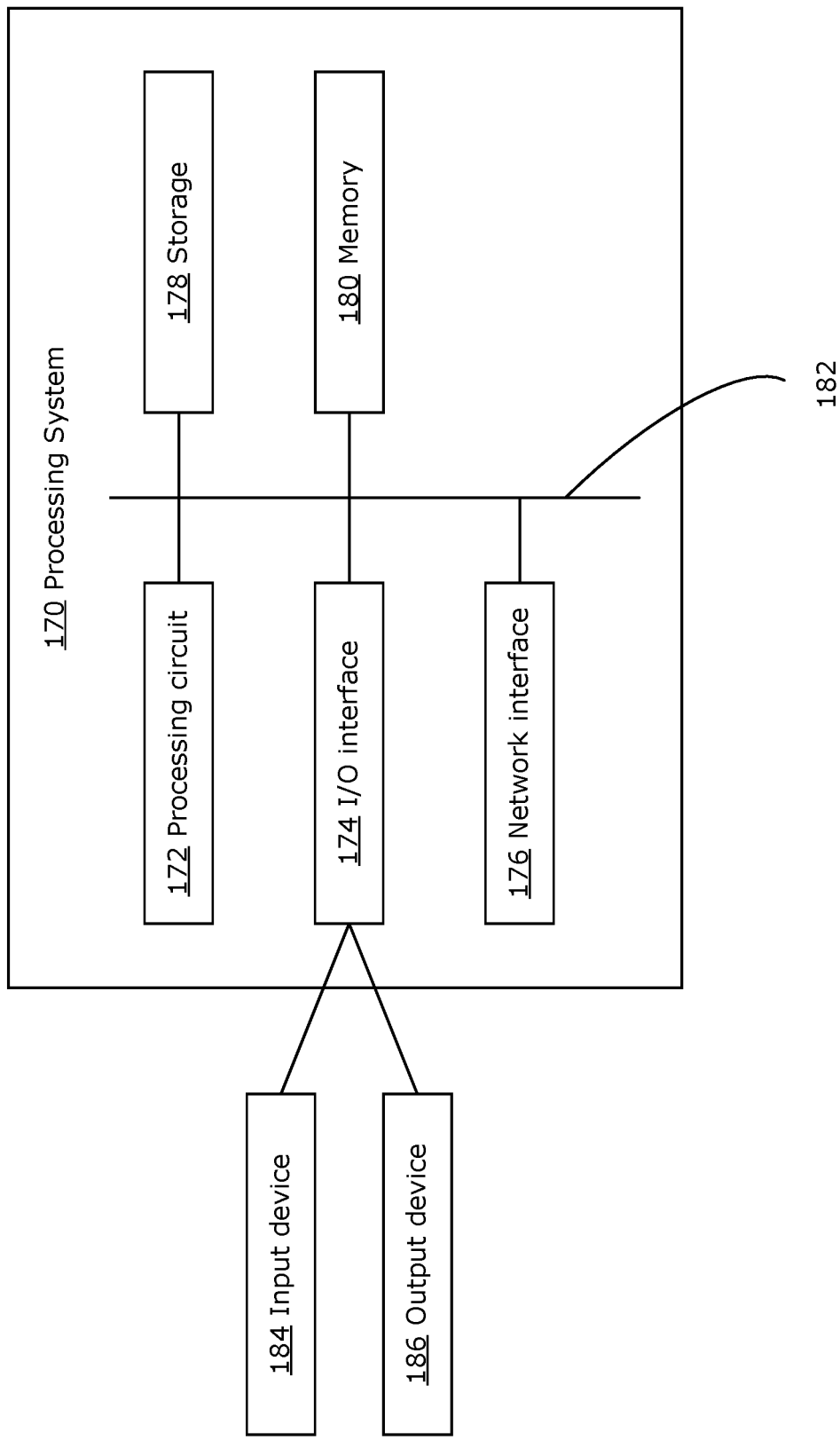
FIG. 13 is a block diagram illustrating an example of a processing system that can be used to implement the gradual adaptation methods disclosed herein, according to example embodiments.

FIG. 13 is a block diagram of an example processing system 170, which may be used to implement methods and systems described herein, including for example the gradual adaptation method 200, or one or more of the modules, components, models or engines of the gradual adaptation method 200. Processing system 170 may be used in a computer device to execute machine executable instructions that implement one or more of or one or more of the modules, components, models or engines of the gradual adaptation method 200. Other processing units suitable for implementing embodiments described in the present disclosure may be used, which may include parts different from those discussed below. Although the Figure shows a single instance of each part, there may be multiple instances of each part in the processing system 170.

The processing system 170 may include one or more hardware processing circuits 172, such as a processor, a microprocessor, a general processor unit (GPU), a hardware accelerator, an application-specific integrated circuit (ASIC), a field-programmable gate array (FPGA), a dedicated logic circuitry, or combinations thereof. The processing system 170 may also include one or more input/output (I/O) interfaces 174, which may enable interfacing with one or more appropriate input devices 184 and/or output devices 186. The processing system 170 may include one or more network interfaces 176 for wired or wireless communication with a network.

The processing system 170 may also include one or more storage units 178, which may include a mass storage unit such as a solid state drive, a hard disk drive, a magnetic disk drive and/or an optical disk drive. The processing system 170 may include one or more memories 180, which may include a volatile or non-volatile memory (e.g., a flash memory, a random access memory (RAM), and/or a read-only memory (ROM)). The memory(ies) 180 may store instructions for execution by the processing circuits(s) 172, such as to carry out examples described in the present disclosure including for example gradual adaptation method 200. The memory(ies) 180 may include other software instructions, such as for implementing an operating system and other applications/functions.

There may be a bus 182 providing communication among parts of the processing system 170, including the processing circuits(s) 172, I/O interface(s) 174, network interface(s) 176, storage unit(s) 178 and/or memory(ies) 180. The bus 182 may be any suitable bus architecture including, for example, a memory bus, a peripheral bus or a video bus.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various parts for performing at least some of the aspects and features of the described methods, be it by way of hardware parts, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/parts, the systems, devices and assemblies could be modified to include additional or fewer of such elements/parts. For example, although any of the elements/parts disclosed may be referenced as being singular, the embodiments disclosed herein could be modified to include a plurality of such elements/parts. The subject matter described herein intends to cover and embrace all suitable changes in technology.

The invention claimed is:

1. A computer implemented method for adapting a machine learning model that is configured by a learned set of configuration parameters, comprising:
    receiving a plurality of labeled data elements that each include: (i) a source image sample including a respective source data object, and (ii) a corresponding source class label for the respective source data object;
    receiving a plurality of target image samples each including a respective target data object;
    performing a plurality of model adaptation epochs, wherein for an initial model adaptation epoch the learned set of configuration parameters is used as a current set of configuration parameters for the machine learning model, each model adaptation epoch comprising:
        predicting for each of the plurality of targets image samples, using the machine learning model configured by the current set of configuration parameters, a corresponding target class label for the respective target data object included in the target image sample;
        generating a plurality of labeled mixed data elements that each include: (i) a mixed image sample including a source data object from one of the source image samples and a target data object from one of the target image samples, and (ii) the corresponding source class label for the source data object and the corresponding target class label for the target data object; and
        adjusting the current set of configuration parameters to minimize a loss function for the machine learning model for the plurality of labeled mixed data elements;
    and
    when performing the plurality of model adaptation epochs is completed, outputting the current set of configuration parameters as a final set of adapted configuration parameters for the machine learning model.

2. The method of claim 1 wherein the machine learning model comprises a plurality of first type layers performing a first type of computation and a plurality of second type layers performing a second type of computation, the first type layers being configured by a first group of the configuration parameters and the second type layers being configured by a second group of the configuration parameters, wherein for an initial set of the plurality of model adaptation epochs, adjusting the current set of configuration parameters comprises adjusting the second group of the configuration parameters while maintaining constant values for the first group of the configuration parameters; and for a further set of the plurality of model adaptation epochs, adjusting the current set of configuration parameters comprises adjusting the both first group of the configuration parameters and the second group of the configuration parameters.

3. The method of claim 2 wherein the first type layers perform matrix multiplication computations, the first group of the configuration parameters including weights for the matrix multiplication computations; and the second type layers perform batch normalization computations, the second group of configuration parameters including batch normalization beta and gamma parameters.

4. The method of claim 2 wherein the machine learning model is a deep learning neural network model comprising multiple network computational blocks that each include one of the first type of layers and one of the second type of layers.

5. The method of claim 1 wherein:
    the data elements each include a source bounding box definition associated with each source class label to indicate a location of the respective source data object within the source image sample;
    the mixed image samples are each composite image samples that include image portions from one of the source image samples and from one of the target image samples; and
    for each model adaptation epoch,
        predicting for each of the plurality of target image samples also comprises predicting a target bounding box definition associated with the corresponding target class label, the target bounding box indicating a location of the respective target data object within the target image sample;

the plurality of labeled mixed data elements each include: (i) a corresponding source bounding box definition that indicates a location of the at least one source data object within the mixed image sample of the labeled mixed data element; (ii) a corresponding target bounding box definition that indicates a location of the at least one target data object within the mixed image sample of the labeled mixed data element.

6. The method of claim 1 wherein at least some of the mixed image samples of the plurality of mixed data elements include a plurality of source data objects from one or more of the source image samples, and a plurality of target data objects from one or more of the target image samples, and the mixed data elements each include corresponding source class labels for each source data object included in the mixed image sample of the mixed data element and corresponding target class labels for each target data object included in the mixed image sample of the mixed data element.

7. The method of claim 1 wherein adjusting the current set of configuration parameters to minimize a loss function for the machine learning model is performed over a set of iterations that are performed for a respective batch of the of labeled mixed data elements.

8. The method of claim 1 further comprising adapting a second machine learning model that is configured by a learned set of second configuration parameters by:
using the machine learning model with the final set of adapted configuration parameters to predict, for each of the plurality of targets image samples, a corresponding target class label for the respective target data object included in the target image sample;
generating a further plurality of labeled mixed data elements that each include: (i) a mixed image sample including a source data object from one of the source image samples and a target data object from one of the target image samples, and (ii) the corresponding source class label for the source data object and the corresponding target class label for the target data object; and
adjusting the set of second configuration parameters to minimize a loss function for the second machine learning model for the further plurality of labeled mixed data elements.

9. The method of claim 8 wherein the second machine learning model has a smaller neural network size than the machine learning model with the final set of adapted configuration parameters.

10. The method of claim 1 further comprising:
receiving a request through a network from computing device to adapt the machine learning model that is configured by a learned set of configuration parameters; and
returning the final set of adapted configuration parameters for the machine learning model to the requesting computer device.

11. The method of claim 1 wherein generating the plurality of labeled mixed data elements includes downscaling a source image portion that includes the source data object.

12. A processing system for adapting a machine learning model that is configured by a learned set of configuration parameters, the processing system, including one or more processing circuits and one or more non-volatile memories storing computer software instructions that, when executed by the one or more processing circuits, configure the processing system to:
receive a plurality of labeled data elements that each include: (i) a source image sample including a respective source data object, and (ii) a corresponding source class label for the respective source data object;
receive a plurality of target image samples each including a respective target data object;
perform a plurality of model adaptation epochs, wherein for an initial model adaptation epoch the learned set of configuration parameters is used as a current set of configuration parameters for the machine learning model, each model adaptation epoch comprising:
predicting for each of the plurality of targets image samples, using the machine learning model configured by the current set of configuration parameters, a corresponding target class label for the respective target data object included in the target image sample;
generating a plurality of labeled mixed data elements that each include: (i) a mixed image sample including a source data object from one of the source image samples and a target data object from one of the target image samples, and (ii) the corresponding source class label for the source data object and the corresponding target class label for the target data object; and
adjusting the current set of configuration parameters to minimize a loss function for the machine learning model for the plurality of labeled mixed data elements;
and
when the plurality of model adaptation epochs are completed, output the current set of configuration parameters as a final set of adapted configuration parameters for the machine learning model.

13. The system of claim 12 wherein the machine learning model comprises a plurality of first type layers performing a first type of computation and a plurality of second type layers performing a second type of computation, the first type layers being configured by a first group of the configuration parameters and the second type layers being configured by a second group of the configuration parameters, wherein for an initial set of the plurality of model adaptation epochs, adjusting the current set of configuration parameters comprises adjusting the second group of the configuration parameters while maintaining constant values for the first group of the configuration parameters; and for a further set of the plurality of model adaptation epochs, adjusting the current set of configuration parameters comprises adjusting the both first group of the configuration parameters and the second group of the configuration parameters.

14. The system of claim 13 wherein the first type layers perform matrix multiplication computations, the first group of the configuration parameters including weights for the matrix multiplication computations; and the second type layers perform batch normalization computations, the second group of configuration parameters including batch normalization beta and gamma parameters.

15. The system of claim 13 wherein the machine learning model is a deep learning neural network model comprising multiple network computational blocks that each include one of the first type of layers and one of the second type of layers.

16. The system of claim 12 wherein:
the data elements each include a source bounding box definition associated with each source class label to indicate a location of the respective source data object within the image sample;
the mixed image samples are each composite image samples that include image portions from one of the source image samples and from one of the target image samples; and
for each model adaptation epoch,
predicting for each of the plurality of target image samples also comprises predicting a target bounding box definition associated with the corresponding target class label, the target bounding box indicating a location of the respective target data object within the target image sample;
the plurality of labeled mixed data elements each include: (i) a corresponding source bounding box definition that indicates a location of the at least one source data object within the mixed image sample of the labeled mixed data element; (ii) a corresponding target bounding box definition that indicates a location of the at least one target data object within the mixed image sample of the labeled mixed data element.

17. The system of claim 12 wherein at least some of the mixed image samples of the plurality of mixed data elements include a plurality of source data objects from one or more of the source image samples, and a plurality of target data objects from one or more of the target image samples, and the mixed data elements each include corresponding source class labels for each source data object included in the mixed image sample of the mixed data element and corresponding target class labels for each target data object included in the mixed image sample of the mixed data element.

18. The system of claim 12 wherein the computer software instructions, when executed by the one or more processing circuits, further configure the processing system to:
adapt a second machine learning model that is configured by a learned set of second configuration parameters by:
using the machine learning model with the final set of adapted configuration parameters to predict, for each of the plurality of targets image samples, a corresponding target class label for the respective target data object included in the target image sample;
generating a further plurality of labeled mixed data elements that each include: (i) a mixed image sample including a source data object from one of the source image samples and a target data object from one of the target image samples, and (ii) the corresponding source class label for the source data object and the corresponding target class label for the target data object; and
adjusting the set of second configuration parameters to minimize a loss function for the second machine learning model for the further plurality of labeled mixed data elements,
wherein the second machine learning model has a smaller neural network size than the machine learning model with the final set of adapted configuration parameters.

19. The system of claim 12 wherein the computer software instructions, when executed by the one or more processing circuits, further configure the processing system to:
receive a request through a network from computing device to adapt the machine learning model that is configured by a learned set of configuration parameters; and
return the final set of adapted configuration parameters for the machine learning model to the requesting computer device.

20. A non-transitory computer readable medium storing computer software instructions that, when executed by the one or more processing circuits of a processing system, cause the processing system to perform a method for adapting a machine learning model that is configured by a learned set of configuration parameters, the method comprising:
receiving a plurality of labeled data elements that each include: (i) a source image sample including a respective source data object, and (ii) a corresponding source class label for the respective source data object;
receiving a plurality of target image samples each including a respective target data object;
performing a plurality of model adaptation epochs, wherein for an initial model adaptation epoch the learned set of configuration parameters is used as a current set of configuration parameters for the machine learning model, each model adaptation epoch comprising:
predicting for each of the plurality of targets image samples, using the machine learning model configured by the current set of configuration parameters, a corresponding target class label for the respective target data object included in the target image sample;
generating a plurality of labeled mixed data elements that each include: (i) a mixed image sample including a source data object from one of the source image samples and a target data object from one of the target image samples, and (ii) the corresponding source class label for the source data object and the corresponding target class label for the target data object; and
adjusting the current set of configuration parameters to minimize a loss function for the machine learning model for the plurality of labeled mixed data elements;
and
when performing the plurality of model adaptation epochs is completed, outputting the current set of configuration parameters as a final set of adapted configuration parameters for the machine learning model.

\* \* \* \* \*

UNITED STATES PATENT AND TRADEMARK OFFICE
CERTIFICATE OF CORRECTION

PATENT NO. : 12,437,516 B2
APPLICATION NO. : 18/317889
DATED : October 7, 2025
INVENTOR(S) : Rindranirina Ramamonjison et al.

Page 1 of 1

It is certified that error appears in the above-identified patent and that said Letters Patent is hereby corrected as shown below:

In the Specification

Column 9, Lines 23-24:
"$D = \{(\hat{x}_i, \hat{y}_i)\}$" should read -- $D = \{(x_i, y_i)\}$ --

Column 10, Line 63:

"partially adapted parameters $\theta_M^s$" should read -- partially adapted parameters $\theta_M^p$ --

Signed and Sealed this
Eighteenth Day of November, 2025

John A. Squires
*Director of the United States Patent and Trademark Office*